March 23, 1954  R. J. THOMAS  2,672,718
MACHINE FOR DISINTEGRATING THE DEBRIS IN FIELD CROP ROWS
Filed Feb. 28, 1950
3 Sheets-Sheet 1
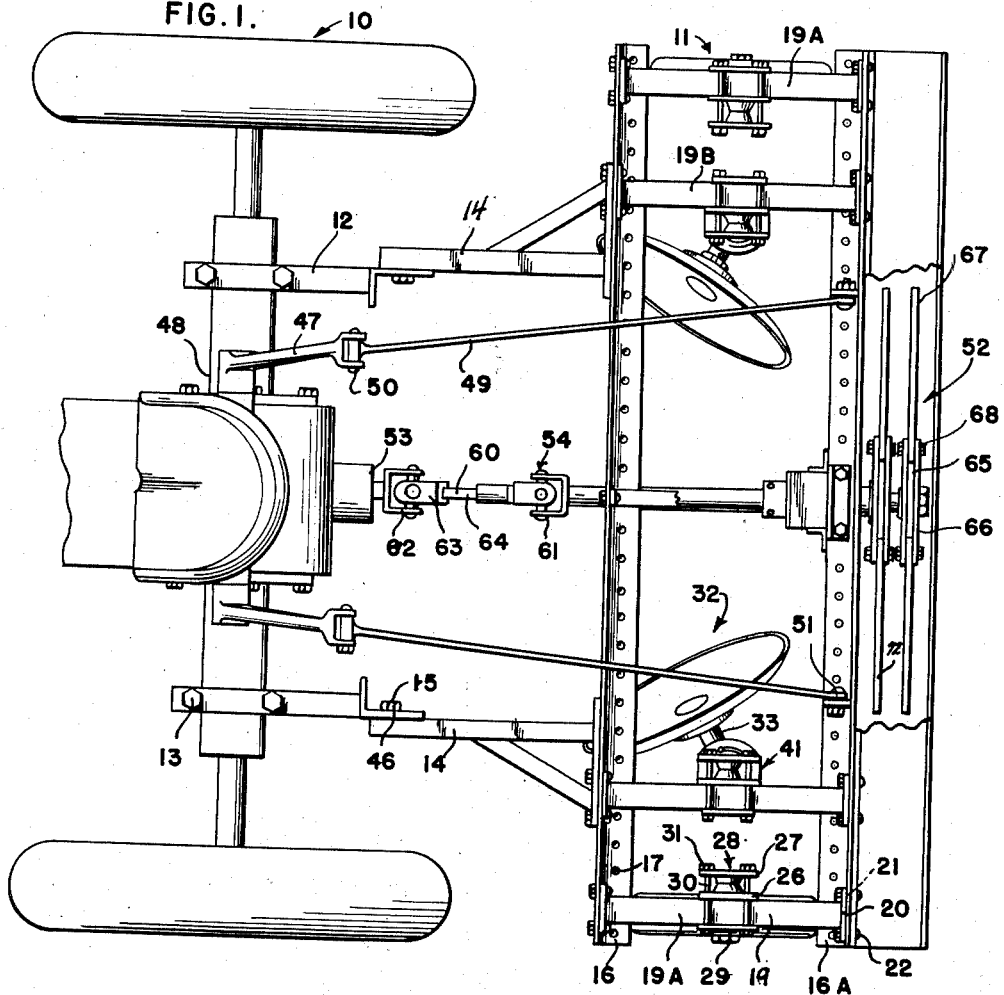
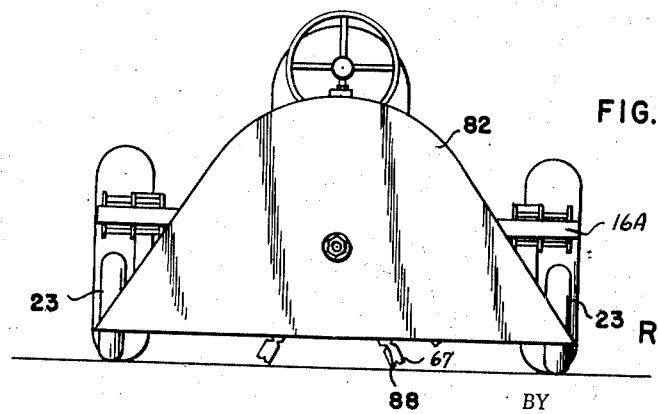
INVENTOR
ROBERT J. THOMAS
BY March 23, 1954     R. J. THOMAS     2,672,718
MACHINE FOR DISINTEGRATING THE DEBRIS IN FIELD CROP ROWS
Filed Feb. 28, 1950     3 Sheets-Sheet 2

INVENTOR
ROBERT J. THOMAS
BY

March 23, 1954

R. J. THOMAS 2,672,718

MACHINE FOR DISINTEGRATING THE DEBRIS IN FIELD CROP ROWS

Filed Feb. 28, 1950

INVENTOR
ROBERT J. THOMAS

BY

Patented Mar. 23, 1954

2,672,718

UNITED STATES PATENT OFFICE 2,672,718

MACHINE FOR DISINTEGRATING THE DEBRIS IN FIELD CROP ROWS

Robert J. Thomas, Cherokee, Iowa

Application February 28, 1950, Serial No. 146,671

6 Claims. (Cl. 55—61)

The present invention relates to agricultural machinery, and more particularly to a machine adapted to disintegrate or mutilate the debris and trash remaining after the harvesting of field row crops, as well as removing the crest of the row, thereby providing a bed in proper condition for seeding for the following season.

Of course it is well known that after the harvesting of field row crops such as, for example, cotton, corn and the like, the stalks are generally left in the ground, thereby requiring the plowing under of the stalks prior to the following season's planting which not only is a laborious and time consuming operation but, in addition, such trash forms an excellent breeding ground for various insects which infest the stalks. Furthermore, the ridge rows which are the result of row crop cultivation are usually eliminated by at least two or more disking operations and hence it can be seen that the proper clearing of the crop rows has always presented a serious and troublesome problem for farmers.

Numerous efforts have been made to provide machines which will disintegrate the trash and debris after harvesting has been completed, and while such machines are, in the main, satisfactory the machines have been quite complex in constructional details which makes the equipment quite expensive both as to initial cost and to maintenance. Furthermore, these prior machines have a tendency to place the mutilated or disintegrated material into windrows, and manifestly, this result is most objectionable.

The present machine comprises a wheeled framework suitably fabricated which is hingedly supported by the rear of a tractor or other mobile vehicle, the framework being connected with the hydraulic lift assembly of the tractor in order that the framework in its entirety may be moved to a point above the ground and maintained in such position when not in use, such as traveling to and from the fields to be treated, and turning at the ends of rows.

A drive shaft is journaled to the framework and is operatively connected to the tractor power take-off, the outer or free end of the drive shaft supporting counter-rotating hammers or beaters, the beaters or hammers being substantially enclosed by means of a hood suitably supported by the rear of the framework.

A pair of adjustably mounted disks are carried by the framework forwardly of the rotating hammers or beaters for gathering the trash, digging the roots and moving the dirt toward the counter-rotating hammers, by means of which hammers the trash which has been disintegrated is directed and re-distributed evenly back upon the cleaned area of the ground.

An object of the present invention is to provide an attachment for tractors by means of which the trash or residue remaining in crop field rows may be fully and completely disintegrated and subsequently re-distributed upon the cleared area to provide a prepared bed for subsequent crop planting.

Yet another object of my invention is to provide a machine of the character described wherein at least a pair of sets of counter-rotating beater bars or hammers are so constructed as to provide equal distribution of the mutilated material.

And still another object of my invention is to provide a beater bar unit for use in a machine of the character described provided with a cutting edge disposed toward the line of movement of the trash or debris, which also functions to pull the debris into the mutilating mechanism.

And still another object of my invention is to provide a novel connecting means between the framework of the machine and the tractor whereby the entire machine may be elevated by the employment of a single hydraulic cylinder on the tractor.

Yet another object of the invention is to provide a pair of disks which are supported by the framework to enable the disks to accommodate various kinds and types of ridge rows.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a plan view of the attachment constructed in accordance with the present invention, the attachment being shown supported by the rear of a tractor of any suitable make.

Figure 2 is an end elevational view of the attachment shown in Figure 1, but being on a somewhat reduced scale.

Figure 3:
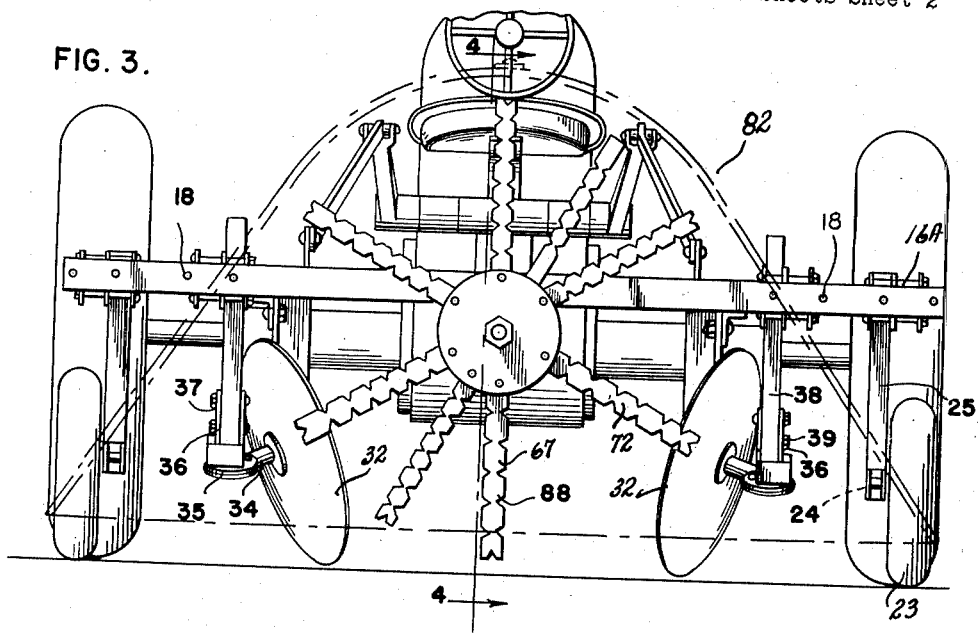
Figure 3 is an end view of the invention, the hood being illustrated in broken lines.

Referring to the drawings, and more particularly to Figure 1, I have indicated a conventional tractor 10, to the rear end of which is supported the wheeled attachment of the present invention indicated generally 11. The tractor 10 is provided with a pair of parallel spaced rearwardly extending brackets 12 which are detachably connected to the rear axle of the tractor by suitable nut and bolt assemblies 13. The frame 11 is pivotally attached to the brackets 12 by means of arms 14, the pivotal connection being indicated at 15.

The frame 11 comprises a pair of spaced parallel horizontally extending angle irons 16 and 16A, the horizontal and vertical flanges of which are formed with a series of equally spaced apertures 17 and 18, respectively. To support the angle irons in the correct spaced relationship, it will be noted that a plurality of I-beams 19 are adapted to rest upon the horizontal flanges of the respective irons, and each end of the I-beams is flanged, as shown at 20, the flanges being provided with openings 21 on opposite sides of the web of the I-beam, the openings being adapted to be placed in registry with the apertures 18 in the irons 16 and 16A and secured thereto by means of nut and bolt assemblies 22. While I have shown the use of four such I-beams, it is, of course, to be understood that a greater number could be employed if the situation warranted additional strengthening or reinforcing. The outermost I-beams 19, denoted 19A, serve to support ground wheels 23, preferably of the type having a pneumatic tire. Each wheel 23 is provided with a spindle or stub shaft 24 and free to turn upon the spindle or stub shaft. The stub shaft is securely fastened to the lower end of a vertically extending I-beam 25. A suitable caster or lock washer is provided for the stub shaft to prevent the wheel from coming off. Shaft 24 is of such length that the outer flange of the I-beam will be located inwardly of the horizontal I-beam 19A and will extend through the gap or space defined by vertical plates 26 and 27 of a bracket assembly indicated 28. The bracket assembly includes an outer vertical plate 29, the plates 26, 27 and 29 being fastly secured to the I-beam 19 by means of a plurality of bolts 30 which extend through alined openings in the respective plates, the bolts having nuts 31 threaded to each end thereof. Manifestly, by loosening the nuts 31, the I-beam 25 may be adjusted longitudinally relative to the beam 19A as well as vertically, the purpose of which will hereinafter be more fully described.

A pair of disks 32 are supported by the innermost beams 19, these beams for the purpose of clarity being identified 19B. Each disk 32 is provided with a spindle 33, the spindle 33 being journaled in a sleeve 34 anchored to flange 35 of a bracket construction 36. The bracket 36 comprises a channel member 37 which is adapted to receive between the vertical walls thereof an I-beam 38. The bracket is pivotally mounted to the lower end of the I-beam by means of a nut and bolt member 39, the nut extending through an aperture (not shown) in the web of the beam 38. In order to secure the bracket 36 at the desired position relative to the beam 38, a pair of nut and bolt assemblies 40 are associated with the bracket on opposite sides of the flanges of the beam 38. The upper end of the beam 38 extends through and is attached to the I-beam 19B by an adjustable bracket device 41, as shown in Figures 1 and 3, and inasmuch as the bracket 41 is similar both in structural detail and operation to the bracket 28, no further description is believed necessary.

Hence, it can be seen that the beam 38 is adjustable vertically and horizontally with respect to the frame, and the spindle of the disk 32 is adjustable relative to the beam 38 in a vertical longitudinal plane and in a horizontal plane. Furthermore, since the beams 19B are adjustable longitudinally of the angle irons 16 and 16A, this will enable the machine to be employed in connection with ridge rows of varying widths. This adjustable mounting of the disks is important, in that it will permit the machine to be used in conjunction with different kinds and types of ridge rows.

The arms 14 previously referred to are channels 42 which are suitably secured at one end to the vertical flange of the angle iron 16, which channels extend downwardly therefrom at an angle relative to the frame 11. The web of the angle channel is provided with a series of spaced openings 43 and the pivotal connection 15 includes a vertically disposed angle piece 44 which is attached by autogenous welding or the like to each bracket 12. The free flange of the angle piece 44 has a series of apertures 45 and by placing the desired aperture 45 in registry with the desired aperture 43 in the beam 42, the respective parts may be pivotally connected by means of a bolt or the like 46. By virtue of its adjustable nature this particular construction will compensate for the position of the frame by reason of the final positioning of the disks and wheels for the terrain being treated.

To elevate or to move the frame 11 about the point of pivot 15, it will be noted that each arm 47 of the hydraulic lift 48 on the tractor pivotally supports one end of a connecting link 49, as indicated at 50. The opposite end of each link 49 is pivotally secured to the horizontal flange of the angle iron 16A, as indicated at 51. Manifestly, upon activation of the hydraulic unit, the links 49 will raise the frame 11 above the ground surface to permit the machine to travel along highways, fields and the like when not in use.

A rotating debris or trash multilating unit denoted generally 52 is supported at the rear of the frame 11 and rotary movement is imparted to the unit from a power take-off 53 on the tractor 10 through a drive connection 54. The drive connection 54 comprises a drive shaft 55 which is suitably supported by a bracket or pillow box 56 attached to the angle iron 16 in any convenient removable manner, such as shown at 57, the bracket 56 being located at approximately the midpoint of the iron 16. The shaft 55 is further supported by a reverse gear box 58, which gear box in turn is fastened to the angle iron 16A by a bracket structure 59. The forward end of the drive shaft 55 is coupled to a telescopic shaft assembly 60 through a universal joint 61, and the opposite end of the shaft 60 is attached to the power take-off 53 by means of a second universal joint 62, and it will be noted that the universal joint 62 is in substantially the same transverse line as the point of pivoting of the frame 11 to the arms 12 which will allow the frame to follow the ground contour longitudinally and permit the frame to be lifted bodily from the surface of the ground when the vehicle is turning at the end of the crop rows. Additionally, this mode of attachment will prevent the frame from moving laterally during forward motion of the tractor. More specifically, the telescoping shaft 60 includes a hollow square tube 63 in which a solid square shaft 64 is slidably mounted, the tube 63 being carried by the universal joint 62 while the solid shaft 64 is associated with the universal joint 61.

Figure 4:
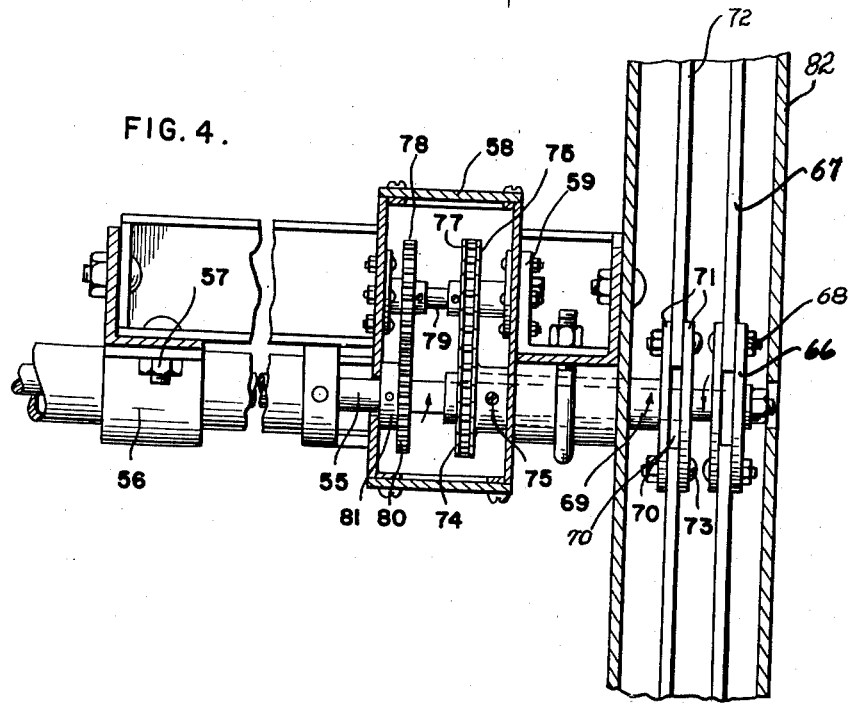
Figure 4 is a vertical sectional view taken along the line 4—4 of Figure 3, but being on a somewhat enlarged scale.
Figure 5:
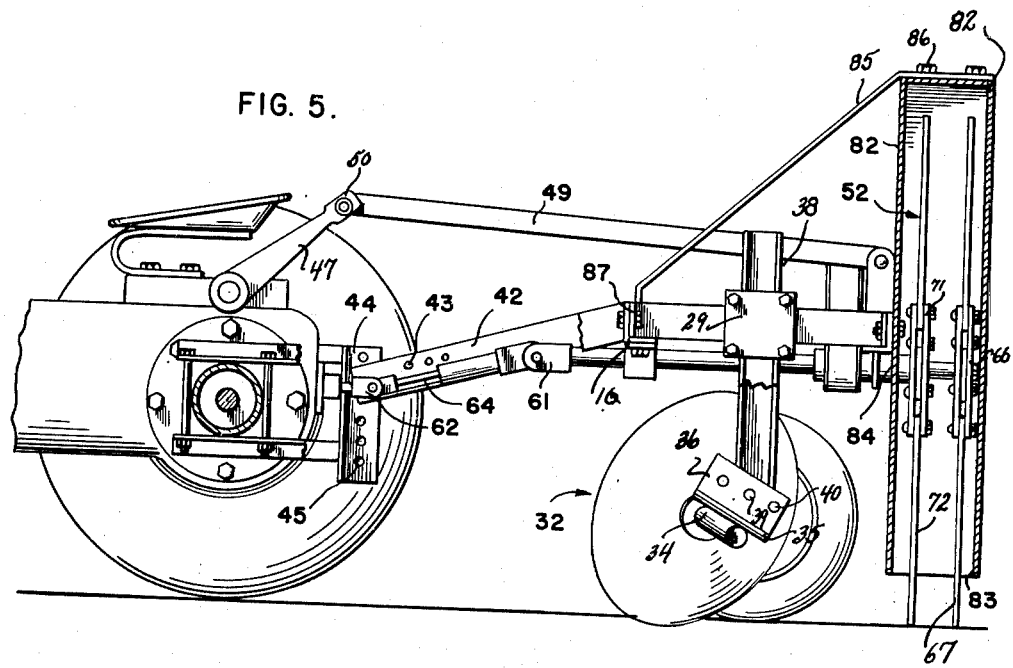
Figure 5 is a view in side elevation, partly in section, of the showing of Figure 1, but being on a somewhat reduced scale.
Figure 6:
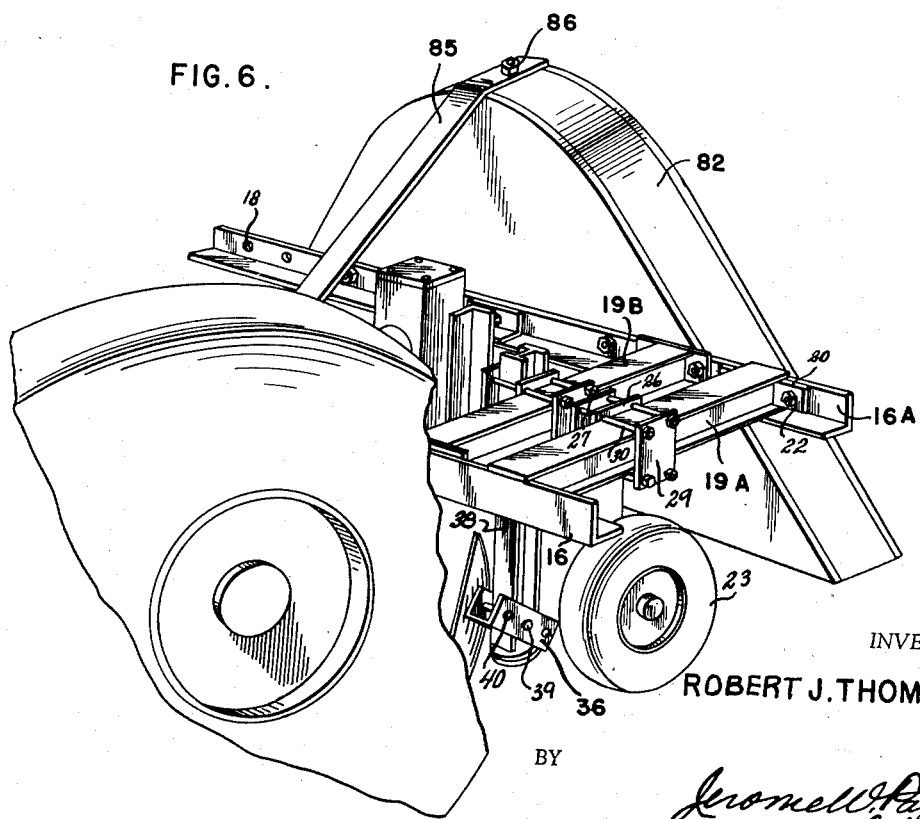
Figure 6 is a view in perspective of the unit, the elevating arms being omitted, but being on a somewhat enlarged scale.

As shown in Figure 4, the shaft 55 extends through the gear box 58, and the free or rear end of the shaft 55 extends beyond the rear angle iron 16A and supports a hub 65. A pair of spaced disks 66 are supported by the hub 65, and a plurality of bars 67 are pivotally attached near their inner ends between the disks 66, as indicated at 68. A sleeve or collar 69 is carried by the shaft 55 forwardly of the disks 66 and supports a hub 70 to which a second pair of disks 71 are attached. A plurality of bars 72 are pivoted between the disks 71, as shown at 73, there being a less number of bars carried by the disks 71 than those carried by the rearmost disks 66. This arrangement will provide an equal distribution of the mutilated or disintegrated material both to the right and left of the center line.

Referring again to Figure 4, it can be seen that the sleeve or collar 69 extends into the gear box 58 and a sprocket 74 is fastened thereto, as indicated at 75. An idler sprocket 76 is journaled in the box 58 above the sprocket 74, and a chain 77 is trained around the respective sprockets. A gear wheel or pinion 78 is journaled in the opposite wall of the box 58 and is suitably fastened to the sprocket 76, as indicated at 79. The gear wheel 78 meshes with a similar gear wheel or pinion 80 which in turn is fastened to the shaft in any suitable manner, as at 81. Consequently, it can be seen that the above described gearing will rotate the disks 71 and, as a consequence, the bars 72 in a direction opposite to that of the disks 66 and the bars 67.

A hood 82 having an open lower end 83 is adapted to house the bars 67 and 72 whereby the multilated debris will be directed back upon the ground, and the lower open end 83 is of such length as to be approximately that of the width of two crop ridge rows. The hood may be attached to the vertical flange of the angle iron 16A by bolts or the like 84 and may be further reinforced by a brace 85 which is attached at one end to the upper portion of the hood, as indicated at 86, and at its opposite extremity to the front angle iron 16, as at 87.

The bars 67 and 72 may be notched, as at 88, and curved or twisted longitudinally somewhat in the manner of a propeller blade in order to direct the cutting edges toward the movement of the trash and this arrangement has a tendency to pull the debris into the mutilating unit 52 and thereby assist in the prevention of clogging the feed flow of the debris.

During the movement of the machine along the crop rows, the disks 32 will dig, uproot or pull out from beneath the surface of the ground the crop row roots, etc. and feed them together with the crest of the row and any other trash or debris rearwardly into the mutilating unit 52. The counter-rotating bars 67 and 72 will completely mutilate plant roots, the topmost earth portion of the ridge rows and all other trash which has been picked up through the single channel defined by the disks 32 and subsequently re-distribute in an even fashion the mutilated substances over the area which has been traversed. The machine will effectively remove the debris above the ground from a surface width which overlaps two crop row ridges approximately half way to the adjoining rows on either side of the frame 11.

In order to shield or protect the vehicle operator from flying debris which occasionally may come from the mutilating bars at the lower end, a metal shield may be located beneath the frame 11 and bridge the area defined by the angle irons 16 and 16A and the I-beams 19B. This shield may be fastened or secured to the frame by means of nut and bolt assemblies or the like.

By virtue of the machine, it can be seen that it will not only mutilate the trash or debris in the crop rows, but also eliminates the ridge rows which are the result of cultivation of this type and, as a consequence, it is unnecessary to perform any disking operations to prepare the bed for subsequent seeding.

The invention is not to be confined to any strict conformity with the showing in the drawings, but may be changed or modified so long as such changes or modifications mark no material departure from the salient features of the invention as expressed in the appended claims.

I claim:

1. A machine for disintegrating the debris in field crop rows adapted to be connected to a mobile vehicle having a power take-off comprising a wheeled frame, a drive shaft journalled in the frame having inner and outer ends, means coupling the inner end of the drive shaft to the said power take-off, a group of radially extending bars pivotally connected to the drive shaft adjacent the outer end thereof, a sleeve on the drive shaft rearwardly of the bars, a second group of radially extending bars pivotally attached to said sleeve, gear means operatively connected with said second group to move said second group of bars in a direction opposite to that of the first group, a pair of spaced depending angularly disposed earth-engaging disks supported by the frame forwardly of the said bars and in laterally spaced forwardly diverging relation relative to said bars for engaging and directing the debris toward the said bars, complemental means on the disks and the frame to adjust the vertical position of each disk relative to the frame, and further complemental means on the frame and disks to adjust the horizontal positions of the disks with respect to the frame.

2. A machine as claimed in claim 1 wherein means are provided to adjust the angular position of the disks with respect to the frame.

3. A machine as claimed in claim 1 wherein a hood is supported by the frame for enclosing the disintegrator bars whereby the disintegrated debris will be scattered evenly over the area traversed.

4. A machine as claimed in claim 1 wherein said sleeve is mounted on the drive shaft forwardly of said bars, a hub supported by the sleeve to which the bars are attached, and a gear train connected with said drive shaft and sleeve so that rotation of the drive shaft will turn the sleeve in a direction opposite to the direction of the drive shaft, the hub supporting a lesser number of bars than those on the drive shaft.

5. A machine as claimed in claim 4 wherein said gear train includes a sprocket fixed to said sleeve, an idler sprocket spaced from the first named sprocket, a chain trained around said sprockets, a gear spaced from and secured to the idler sprocket, and a gear wheel fixed to said drive shaft and meshing with said first named gear wheel.

6. A machine as claimed in claim 1 wherein said drive shaft includes a shaft journaled in said frame, a telescopic shaft section, a universal joint between the drive shaft and the telescopic shaft section, and a second universal joint between the free end of said telescopic shaft section and the power take-off.

ROBERT J. THOMAS.

References Cited in the file of this patent

UNITED STATES PATENTS

| Number    | Name          | Date           |
|-----------|---------------|----------------|
| 1,059,404 | Spiva         | Apr. 22, 1913  |
| 1,117,314 | Blunck        | Nov. 17, 1914  |
| 2,400,595 | Okeson        | May 21, 1936   |
| 2,479,510 | Pollard et al.| Aug. 16, 1949  |
| 2,500,914 | Sells et al.  | Mar. 14, 1950  |
| 2,526,396 | Nowlin        | Oct. 17, 1950  |
| 2,569,308 | Haapala       | Sept. 25, 1951 |